(12) United States Patent
Webb

(10) Patent No.: US 8,769,486 B2
(45) Date of Patent: Jul. 1, 2014

(54) DYNAMICALLY GENERATING STATICALLY-TYPED PROXIES FOR DYNAMICALLY-TYPED FUNCTIONS

(75) Inventor: Peter Hartwell Webb, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 419 days.

(21) Appl. No.: 13/176,403

(22) Filed: Jul. 5, 2011

(65) Prior Publication Data

US 2012/0180025 A1    Jul. 12, 2012

Related U.S. Application Data

(60) Provisional application No. 61/430,536, filed on Jan. 6, 2011.

(51) Int. Cl.
*G06F 9/44* (2006.01)

(52) U.S. Cl.
CPC ..................................... *G06F 8/30* (2013.01)
USPC ........................................................ 717/106

(58) Field of Classification Search
CPC ....................................................... G06F 8/30
USPC ........................................................ 717/106
See application file for complete search history.

(56) References Cited

U.S. PATENT DOCUMENTS 6,799,320 B1    9/2004  Elvanoglu et al.
7,051,338 B1 *  5/2006  Foti et al. ...................... 719/328

FOREIGN PATENT DOCUMENTS

WO    2006/130871 A3    12/2006

OTHER PUBLICATIONS

Alex, "7.3 Passing arguments by reference", Jul. 24, 2007, pp. 1-4, http://www.learncpp.com/cpp-tutorial/73-passing-arguments-by-reference/.*
Furmankiewicz, Jacek, "Swing JavaBuilder: Maximum productivity with minimum code, Release 1.1," (2010).
Jython, "Accessing Java from jython," retrieved online at: http://www.jython.org/docs/usejava.html (2007).
Liberty, Jesse, "Attributes and Reflection," Programming C#, Chpt. 18, O'Reilly & Associates (2001).
MathWorks, "MATLAB Compiler, The Language of Technical Computing, User's Guide, Version 4," The MathWorks, Inc. (2004).
MathWorks, "MATLAB, The Language of Technical Computing, Getting Started with MATLAB, Verion 7," The MathWorks, Inc. (2006).
msdn, ".NET Framework 4," retrieved online at http://msdn.microsoft.com/en-us/library/w0x726c2(d=printer).aspx (2011).

(Continued)

*Primary Examiner* — Wei Zhen
*Assistant Examiner* — Lanny Ung
(74) *Attorney, Agent, or Firm* — Nelson Mullins Riley & Scarborough LLP

(57) ABSTRACT

Embodiments of the present application may simplify an integration of statically typed and dynamically typed languages by automatically generating an implementation of a statically typed native interface for a given set of dynamically typed functions. In an embodiment, functions in a dynamically typed language are automatically interconnected with functions in a statically typed language. Code that bridges and/or connects a statically typed interface and a dynamically typed interface embodied in the dynamically typed source code may be automatically generated. The statically typed interface may be provided by a user. Further, an extensible set of runtime rules that determine how to convert between statically typed and dynamically typed data may be provided.

20 Claims, 11 Drawing Sheets

(56) References Cited

OTHER PUBLICATIONS

NetBuilder, retrieved online at http://strc.herts.ac.uk/bio/maria/Apostrophe/Pdf/NetBuilder-prime.pdf (2006).

Visual Studio .NET IDE, retrieved online at http://www.startvbdotnet.com/language/ide.aspx (2010).

Webb, Peter, "Introducing Type Safe APIs with Builder NE," Loren on the Art of MATLAB, retrieved online at: http://blogs.mathworks.com/loren/2011/06/03/introducing-type-safe-apis-with-builder-ne/, pp. 1-4 (2011).

International Search Report and Written Opinion for Application No. PCT/US2012/020510, pp. 1-12, dated Apr. 3, 2012.

Shure, Loren, "Introducing Type Safe APIs with Builder NE," Loren on the Art of MATLAB, retrieved online at: http://blogs.mathworks.com/loren/2011/06/03/introducing-type-safe-apis-with-builder-ne/, 4 pages (2011).

International Preliminary Report on Patentability for Application No. PCT/US2012/020510, 15 pages, dated Apr. 17, 2013.

* cited by examiner

550 — Invoke target environment reflection mechanism on the target environment artifact for determining target function signatures 552

Detect errors such as argument number mismatch, missing type specification and/or target interface contains functions with no exported binding 554

Generate a type safe API for each exported function using a mapping between MATLAB types and native types 556

Generate MATLAB functions and MATLAB classes for issuing warnings or errors when input or output types differ from the known types 558

Invoke a test suite for determining test data 560

Generate target environment test suite and/or example programs 562

Run MATLAB type validating API for determining if there are any type constraint violations 564

Generate a target environment component and integrate the component into a larger application 566

*Fig. 5B*

DYNAMICALLY GENERATING STATICALLY-TYPED PROXIES FOR DYNAMICALLY-TYPED FUNCTIONS

RELATED APPLICATIONS

This application claims the benefit of provisional patent application U.S. Ser. No. 61/430,536, filed Jan. 6, 2011, the content of which is hereby incorporated by reference.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5B illustrates an exemplary workflow where the dynamically typed language is the MATLAB language according to an embodiment of the present invention;

DETAILED DESCRIPTION

Figure 1:
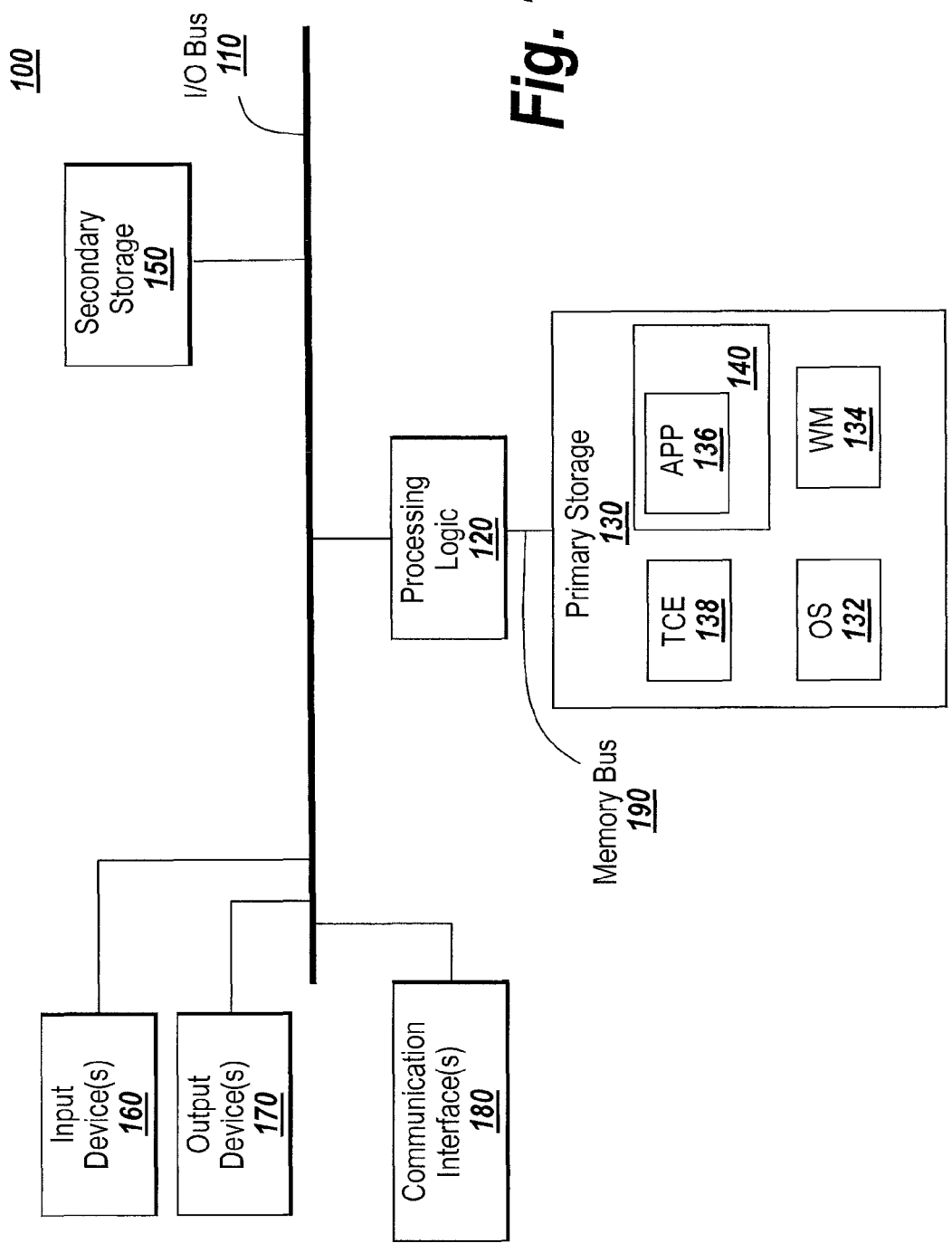
FIG. 1 illustrates a block diagram of an example of a computing device that may be used with one or more embodiments of the invention.

The following detailed description refers to the accompanying drawings. The same reference numbers in different drawings may identify the same or similar features illustrated in the drawings.

According to various embodiments, a computer-implemented method is provided. The method may include receiving a specification of a statically typed first interface to a first function. The first interface may include a specification of a data type of a parameter of the first function. The method may further include identifying a second function corresponding to the specification of the statically typed first interface to a first function. The second function may be written using a dynamically typed language. The method may also include generating an implementation of the first function that invokes the second function.

In some embodiments, one or more tangible computer-readable storage media is provided. The tangible computer-readable storage media may store one or more instructions for receiving a specification of a statically typed first interface to a first function. The first interface may include a specification of a data type of a parameter of the first function. The tangible computer-readable storage media may further store one or more instructions for identifying a second function corresponding to the specification of the statically typed first interface to a first function. The second function may be written using a dynamically typed language. The tangible computer-readable storage media may also store one or more instructions for generating an implementation of the first function that invokes the second function.

According to some embodiments, a system including a first processor is provided. The first processor may receive a specification of a statically typed first interface to a first function. The first interface may include a specification of a data type of a parameter of the first function. The first processor may also identify a second function corresponding to the specification of the statically typed first interface to a first function. The second function may be written using a dynamically typed language. The first processor may further generate an implementation of the first function that invokes the second function.

A computer program may be generated through a series of stages. For example, at a source code development stage, a programmer may write source code. At a compilation stage, a compiler may transform the source code into a machine-readable object code. At a runtime stage, a computer may load and execute the object code. The execution of the object code may invoke functions written by the programmer. An example of a member function may be a member function of an object class, such as a member function of a C++ or JAVA object class.

The programmer may write the source code in a dynamically typed language, such as the MATLAB® language, and/or in a statically typed language, such as C++ or C#. If both types of languages are used, the programmer may indicate functions in the dynamically typed language that are required by the statically typed language.

Dynamically typed languages dynamically bind data type information to data at or during runtime. Moreover, in a dynamically typed language a data type associated with data may change during runtime. Exemplary dynamically typed languages may include, among others, Lisp, Perl, Python, MATLAB, Mumps, Smalltalk, Ruby, Logo, Tcl, Self, Common Lisp, Objective-C, Rebol, Squeak. Statically typed languages, on the other hand, bind data type information to data prior to runtime, such as during source code development and/or compilation. During runtime, the data type of data may remain static, i.e., not change. Exemplary statically typed languages may include, among others, Ada, C++, C#, Pascal, Eiffel, Fortran, Fantom, Java, PEARL, Scala, SPARK.

Passing data between a statically typed language and a dynamically typed language may be complicated. For example, a programmer may have to develop an appropriate interface between a statically typed language and a dynamically typed language. The interface may involve additional code that may be used to connect functions in the dynamically typed language to functions in the statically typed language. A compiler may transform the additional code into machine readable instructions. A computer may load and execute the machine readable instructions. When a dynamically typed function is invoked, the computer may execute the additional code written by the programmer. The additional code may transform statically typed input data into dynamically typed input data, call the dynamically typed function and then transform dynamically typed data that may be output from the dynamically typed function into a data type that may be returned to a function written in the statically typed language.

Embodiments of the present application automatically interconnect functions in a dynamically typed language with functions in a statically typed language. In an embodiment, code that bridges and/or connects a statically typed interface and a dynamically typed interface embodied in the dynamically typed source code may be automatically generated. The statically typed interface may be provided by the user. Further, an extensible set of runtime rules that determine how to convert between statically typed data and dynamically typed data may be provided.

Embodiments of the present application may simplify integration of statically typed and dynamically typed languages by automatically generating an implementation of a statically typed native interface for a given set of dynamically typed functions. Users may provide a statically typed interface expressed with types native to the statically typed language. Embodiments of the present application may automatically convert the statically typed data provided to the statically typed native interface into dynamically typed data suitable for passing to the corresponding dynamically typed functions. Alternatively, data may be passed by reference between the two environments without being converted. Embodiments of the present application may also convert dynamically typed data output by the dynamically typed functions into statically typed data suitable for return from the functions in the statically typed interface. Users may customize the interface generation process. The generated implementation may not require familiarity with data types or programming models of the dynamically typed language. The generated implementation may not require a programmer to master concepts of both the statically typed language and the dynamically typed language. Furthermore, because the statically typed language interacts with the dynamically typed functions via the generated interface, the dynamically typed functions may execute in a separate location (e.g., a different process, a difference machine, etc.). Embodiments of the present application may preserve human-readability of the interface code. Accordingly, programmers may read and use a resulting application programming interface (API) that may be generated based on the interface code.

One or more embodiments of the invention may be implemented on one or more computing devices. The one or more computing devices may be a system or part of a system. The one or more computing devices may include, for example, a desktop computer, laptop computer, client computer, server computer, mainframe computer, personal digital assistant (PDA), netbook computer, tablet computer, web-enabled cellular telephone, smart phone, or some other computing device.

FIG. 1 illustrates an example of a computing device 100 that may be used with one or more embodiments of the invention. Referring to FIG. 1, the computing device 100 may include one or more components, such as processing logic 120, primary storage 130, secondary storage 150, one or more input devices 160, one or more output devices 170, and one or more communication interfaces 180, coupled together by one or more buses, such as input-output (I/O) bus 110 and memory bus 190. Note that computing device 100 is an example of a computing device that may implement one or more embodiments of the invention.

The I/O bus 110 may be an interconnect bus that enables communication between various components in the computing device 100, such as processing logic 120, secondary storage 150, input devices 160, output devices 170, and communication interfaces 180. The communication may include, among other things, transferring information (e.g., data, control information, executable instructions) between the components.

The memory bus 190 may be an interconnect bus that may enable information to be transferred between the processing logic 120 and the primary storage 130. The information may include instructions and/or data that may be executed, manipulated, and/or otherwise processed by processing logic 120. The instructions and/or data may include instructions and/or data that may implement one or more embodiments of the invention.

The processing logic 120 may include logic that may interpret, execute, and/or otherwise process information contained in, for example, the primary storage 130 and/or secondary storage 150. The information may include computer-executable instructions and/or data that may implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processing logic 120 may comprise a single core or multiple cores. Moreover, processing logic 120 may comprise a system-on-chip (SoC) or system-in-package (SiP). An example of a processor that may be used to implement processing logic 120 is the Intel® Xeon® processor available from Intel Corporation, Santa Clara, Calif.

The secondary storage 150 may include a non-transitory tangible computer-readable storage media that is accessible to the processing logic 120 via I/O bus 110. The secondary storage 150 may store information for the processing logic 120. The information may be executed, interpreted, manipulated, and/or otherwise processed by the processing logic 120. The secondary storage 150 may comprise, for example, a storage device, such as a magnetic disk, optical disk, random-access memory (RAM) disk, and/or flash drive. The information may be stored on one or more non-transitory tangible computer-readable media contained in the storage device. This media may include, for example, magnetic discs, optical discs, and/or memory devices (e.g., flash memory devices, static RAM (SRAM) devices, dynamic RAM (DRAM) devices, or other memory devices). The information may include data and/or computer-executable instructions that may implement one or more embodiments of the invention.

Input devices 160 may include one or more devices that may be used to input information into computing device 100. Devices that may be used to input information into computing device 100 may include, for example, a keyboard (e.g., hardware keyboard, software keyboard), computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, eyeball controlled device, finger mouse, light pen, light gun, eye tracking device, gesture tracking device, steering wheel, yoke, jog dial, space ball, directional pad, dance pad, soap mouse, haptic device, tactile device, neural device, multipoint input device, discrete pointing device, or some other input device. The information may include spatial (e.g., continuous, multi-dimensional) data that may be input into computing device 100, for example, using a device such as a computer mouse. The information may also include other forms of data, such as, for example, text that may be input using a keyboard.

Output devices 170 may include one or more devices that may output information from the computing device 100. Devices that may output information from the computing device 100 may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer (e.g., a three-dimensional (3D) printer, laser printer), speaker, video projector, volumetric display device, plotter, actuator (e.g., electrical motor) or some other output device. Output devices 170 may be directed by, for example, the processing logic 120, to output the information from the computing device 100. The information may be presented (e.g., displayed, printed) by output devices 170. The information may include, for example, graphical user interface (GUI) elements (e.g., windows, widgets, dialog boxes, or other GUI elements), graphical representations, pictures, text, or other information that may be presented by output devices 170. Note that the information may be presented on one or more output devices 170 in a stereoscopic view to enable, for example, a perception of depth.

Communication interfaces 180 may include one or more devices that contain logic configured to (1) interface the computing device 100 with, for example, one or more communication networks and (2) enable the computing device 100 to communicate with one or more devices connected to the communication networks.

Communication interfaces 180 may include one or more transceiver-like mechanisms that enable the computing device 100 to communicate with devices connected to the communication networks. Communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, or other device suitable for interfacing the computing device 100 to the communication networks.

The primary storage 130 is accessible to the processing logic 120 via bus 190. The primary storage 130 may be a non-transitory tangible computer-readable media that may store information for processing logic 120. The information may include computer-executable instructions and/or data that may implement operating system (OS) 132, windows manager (WM) 134, an application 136 (APP), and a technical computing environment (TCE) 138. The instructions may be executed, interpreted, and/or otherwise processed by processing logic 120.

The primary storage 130 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

OS 132 may be a conventional operating system that may implement various conventional operating system functions. These functions may include, for example, scheduling one or more portions of APP 136 and/or TCE 138 to run on the processing logic 120, managing the primary storage 130, controlling access to various components associated with the computing device 100 (e.g., secondary storage 150, input devices 160, output devices 170, communication interfaces 180), and controlling access to data received and/or transmitted by these components. The OS 132 may execute directly on hardware or in a virtual machine.

A virtual machine may be provided to handle a process running on multiple processors so that the process may appear to be using only one computing resource rather than multiple computing resources. Virtualization may be employed in the computing device 100 so that infrastructure and resources in the computing device may be shared dynamically.

Examples of operating systems that may be used to implement OS 132 include, but are not limited to, the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include Microsoft Windows Phone, Microsoft Windows 7, Microsoft Windows Vista, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif. The Symbian operating system is available from the Symbian Foundation, London, United Kingdom.

WM 134 may be a conventional window manager that may manage GUI elements, such as widgets, dialog boxes, and windows, that may be part of the OS 132, TCE 138, and APP 136. The GUI elements may be displayed on an output device 170. The WM 134 may also be configured to (1) capture one or more positions of interactions with input devices 160 and/or other data associated with the input devices 160, and (2) provide the positions and/or data to, for example, OS 132, APP 136, and/or TCE 138. The positions and/or data may be provided in messages that are sent to the OS 132, APP 136, and/or TCE 138. Examples of window managers that may be used to implement WM 134 may include, but are not limited to, X windows, GNOME, and KDE, which are often used with the Linux operating system, and window managers used with the Microsoft Windows Phone, Microsoft Windows XP, Microsoft Windows Vista, and Microsoft Windows 7 operating systems. It should be noted that other window managers or components that implement various functions associated with window managers may be used to implement WM 134.

APP 136 may be designed to perform a particular task or tasks. APP 136 may be an executable and/or interpretable version of a software application that may be written in a programming language, such as C, C++, or some other programming language. The programming environment may be a statically typed development environment. Some or all of APP 136 may be written by a user of computing device 100, supplied by a vendor, or generated by TCE 138. Some or all of APP 136 may operate under the control of OS 132. APP 136 may include computer-executable instructions and/or data that may implement one or more embodiments of the invention.

TCE 138 may include hardware-based and/or software-based logic, which may provide a computing environment that may allow various tasks, related to various disciplines, such as mathematics, science, engineering, mechanics, physics, medicine, business, biology, and/or finance, to be performed.

In addition, the TCE 138 may perform matrix and/or vector formulations that may be used for data analysis, data visualization, application development, simulation, modeling, and/or algorithm development. These matrix and/or vector formulations may be used in many areas, such as mathematics, science, engineering, mechanics, physics, medicine, business, biology, and/or finance.

The TCE 138 may further provide functions and/or tools for generating, for example, plots, surfaces, images, volumetric representations, or other representations. The TCE 138 may provide these functions and/or tools using toolboxes (e.g., toolboxes for signal processing, image processing, data plotting, and/or parallel processing). In addition, the TCE 138 may provide these functions as block sets. The TCE 138 may also provide these functions in other ways, such as via a library or a database.

Examples of TCEs that may be adapted to implement one or more embodiments of the invention may include, but are not limited to, Simulink®, Stateflow®, Simscape™, SimMechanics™, and SimEvents®, which are available from MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; Advanced Design System, VEE Pro, and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; Working Model 2D from Design Simulation Technologies, Inc.; Working Model from Design Simulation Technologies, Inc.; Computer Aided Three-dimensional Interactive Application (CATIA) and SolidWorks from Dassault Systems; and Ptolemy from the University of California at Berkeley.

Figure 2:
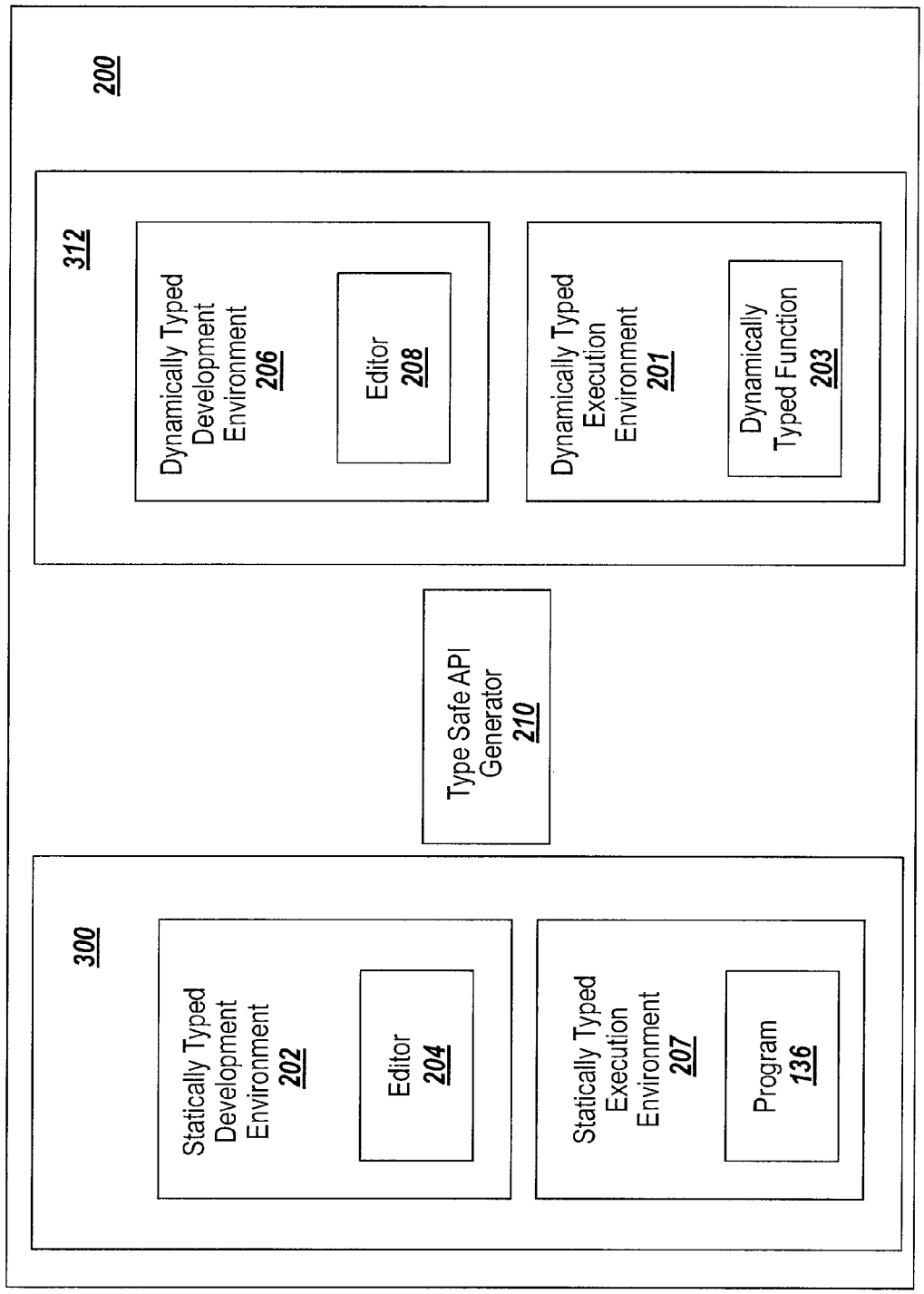
FIG. 2 illustrates a block diagram of an example of a programming and execution environment that may implement one or more embodiments of the present invention.

An exemplary programming and execution environment 200 that may implement one or more embodiments of the present invention is illustrated in FIG. 2. Referring to FIG. 2, the programming and execution environment 200 may include a statically typed development environment 202 that may use a statically typed language 300 and a dynamically typed development environment 206 that may use a dynamically typed language 312. The statically typed development environment 202 may include an editor 204 for generating application 136, which may contain code (e.g., source code) written in a statically typed language. The dynamically typed development environment 206 may also include an editor 208.

The statically typed development environment 202 may generate the statically typed application 136, which may use standard functions and services provided by statically typed execution environment 207. The standard services may include loading and executing application 136. The dynamically typed execution environment 201 may provide similar functions and services for a dynamically typed function 203. TCE 138 is an example of a dynamically typed execution environment 201.

A type-safe API generator 210 provided in the programming and execution environment 200 may enable communication between the statically typed development environment 202 and the dynamically typed development environment 206. Specifically, the type-safe API generator 210 may analyze a dynamically typed function 203 developed in the dynamically typed development environment 206. The type-safe API generator 210 may generate an implementation of a statically typed function 324 that may be suitable for use in the statically typed development environment 202. The statically typed function 324 may invoke the dynamically typed function 203. This analysis and generation may be performed before the source code of the statically typed program 136 is compiled into object code.

Alternatively, the analysis and generation may be performed while the statically typed program 136 is executing. Here, for example, after the statically typed execution environment 207 sends a call to a dynamically typed function 203 in the dynamically typed execution environment 201, the type-safe API generator 210 may generate an implementation of the function in the statically typed language 300 of the statically typed development environment 202. The type-safe API generator 210 may compile and load this implementation dynamically into the statically typed execution environment 207.

According to various embodiments, the statically typed programming language may include a language, where a data type of data may be determined before runtime, such as C#. The dynamically typed programming language may include a language, where a data type of data may be determined at runtime, such as MATLAB. The statically typed execution environment 207 may include, for example, the Common Language Runtime (CLR) developed by Microsoft, and the dynamically typed execution environment 201 may include, for example, the MATLAB Compiler Runtime developed by the MathWorks, Inc.

When a statically typed language and a dynamically typed language are used simultaneously in an exemplary software program, the application generated in the statically typed language may make a call to a function in the dynamically typed language. Various embodiments may manage data conversion between the statically typed language and the dynamically typed language in both directions, i.e. from the statically typed language to the dynamically typed language and from dynamically typed language to the statically typed language.

Figure 3A:
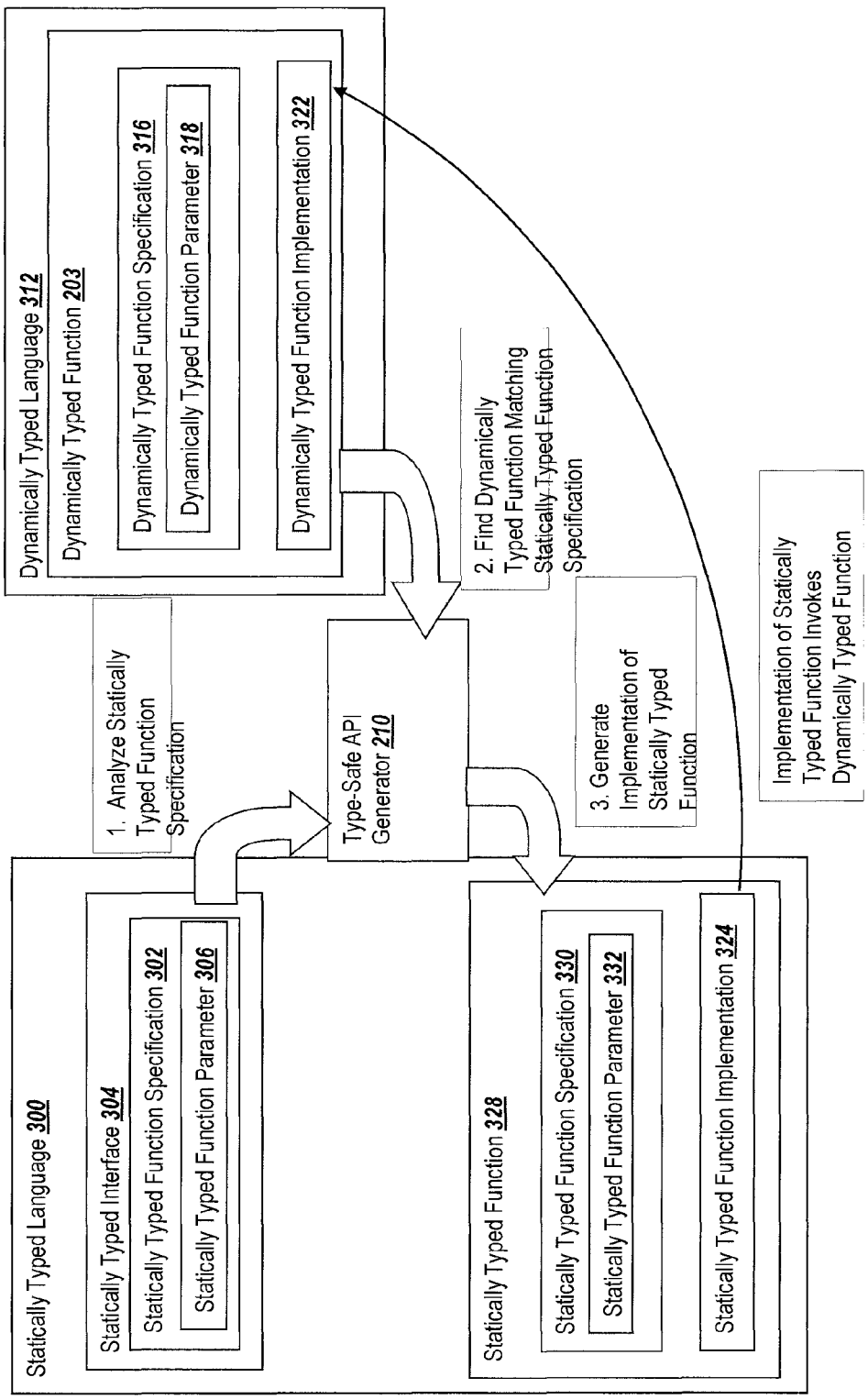
FIG. 3A illustrates an exemplary architectural diagram of an exemplary embodiment of the present invention.
Figure 3B:
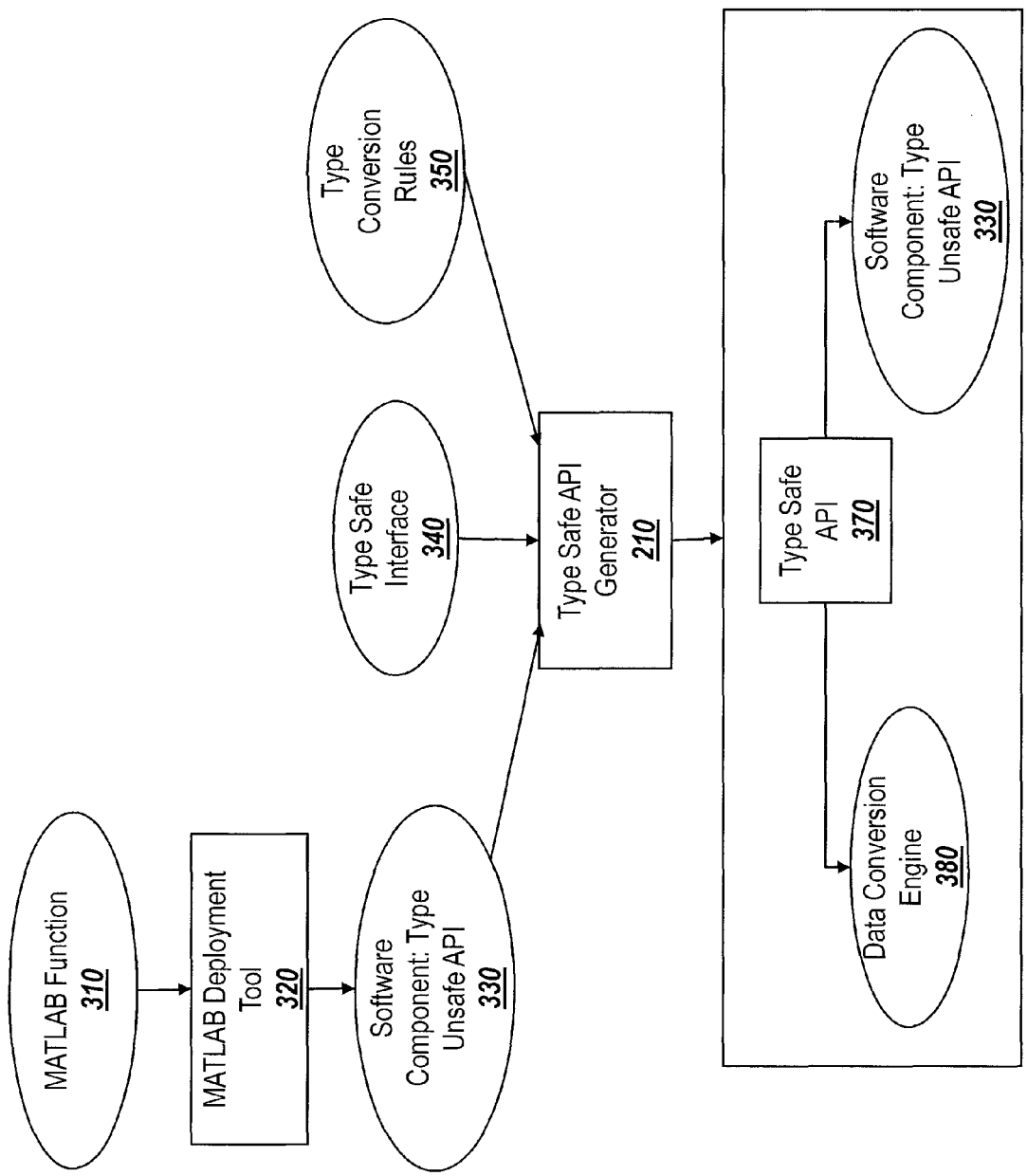
FIG. 3B illustrates an exemplary architectural diagram of simultaneous use of dynamically typed functions and statically typed functions according to an embodiment of the invention.
Figure 4A:
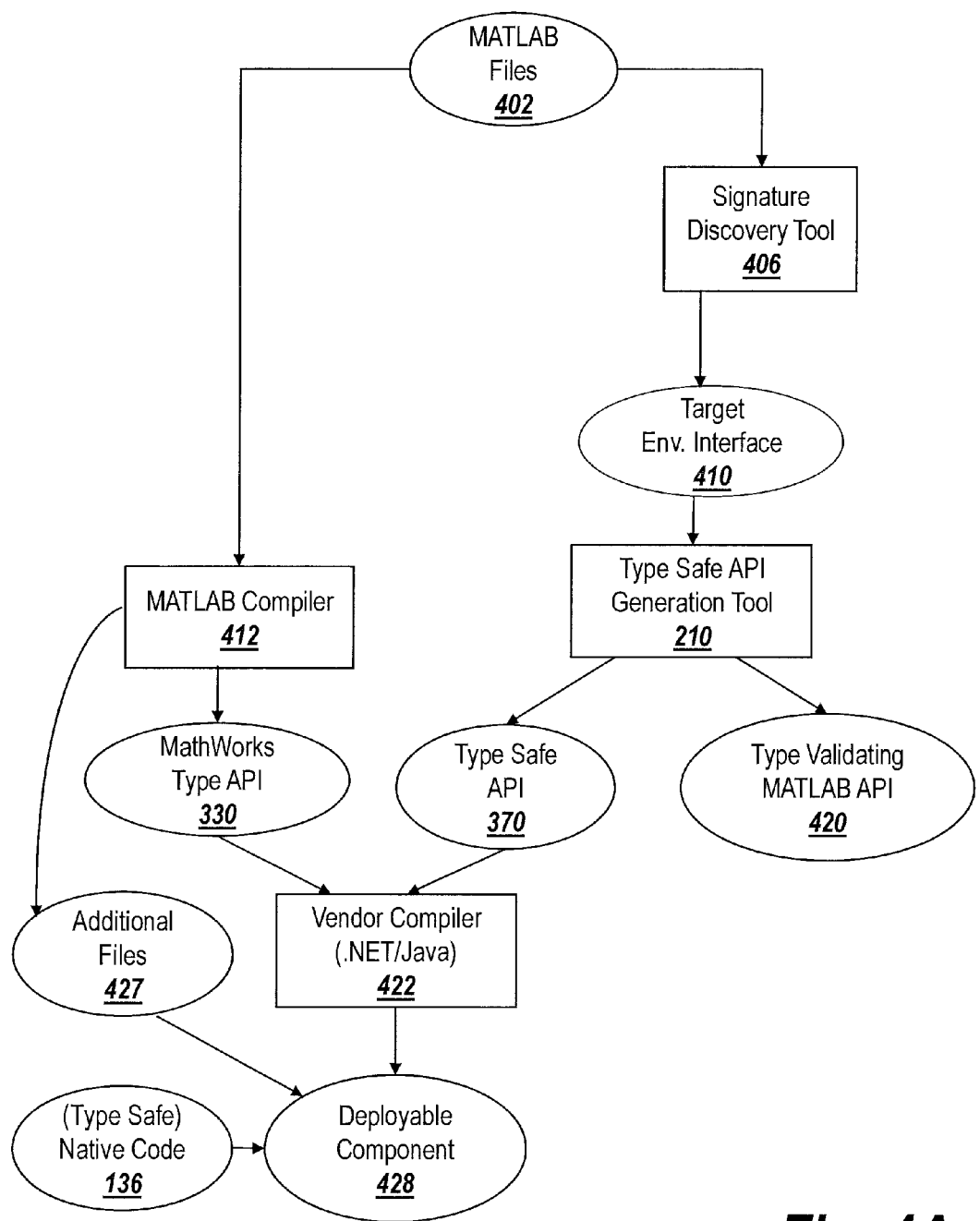
FIG. 4A illustrates an exemplary functional diagram of compiler and builder components for generating an exemplary type-safe interface according to an embodiment of the invention.

FIGS. 3A, 3B and 4A illustrate data conversion between the statically typed language and the dynamically typed language at different levels of detail. FIG. 3A provides an example of type-safe API generation that may be employed by type-safe API generator 210. FIG. 3B illustrates examples of processing that may be performed by the data conversion engine 380 and the type conversion rules 350. FIG. 4A provides a high-level view, illustrating example relationships between the type-safe API generator 210 and other tools, and environments that may be used during software development. A description of these figures is provided below.

FIG. 3A illustrates an architectural overview of an exemplary embodiment where a statically typed language 300 interacts with a dynamically typed language 312. One or more functions in the dynamically typed language 312 may be selected (e.g., by a user) and the selected functions may be exported to the statically typed language 300. An implementation 324 of the selected function in the statically typed language may be automatically generated for invoking the implementation 322 of the selected function in the dynamically typed language. This process is explained in further detail below.

A statically typed function specification 302 may be provided in a statically typed interface 304. The interface 304, may be, for example, a prototype definition. In an embodiment, a user may provide at least a part of the statically typed interface 304. According to other embodiments, the statically typed interface 304 may be automatically generated using, in part, data derived from runtime analysis of the typical uses of dynamically typed function 203. Automatic generation of the statically typed interface 304 may use, in part, data provided by the user. The statically typed function specification 302 may be analyzed to determine a function signature associated with the statically typed function specification 302. The function signature may include a name of the function. The function signature may also include names and data types of the inputs and/or the outputs of the function that may be defined in the statically typed function specification 302. The statically typed function specification 302 may include zero or more inputs and zero or more outputs. The statically typed function specification 302 may also include zero or more statically typed function parameters 306.

After the statically typed function specification 302 is provided one or more dynamically typed functions 203 in the dynamically typed language 312 that match the statically typed function specification 302 may be identified. The identification may be done, for example, by analyzing a dynamically typed function specification 316 associated with the dynamically typed function 203. The dynamically typed function specification 316 may include zero or more dynamically typed function parameters 318. The dynamically typed function specification 316 may also include zero or more inputs and zero or more outputs.

After identifying one or more dynamically typed functions 203 in the dynamically typed language 312 that match the statically typed function specification 302, a type-safe API generator 210 may automatically generate a statically typed function 328 as a proxy of the identified dynamically typed function 203 in the statically typed language 300. The statically typed function 328 may invoke the dynamically typed function 203 from the statically typed language 300. The statically typed function 328 may include a statically typed function specification 330 that matches the statically typed function specification 302, and a statically typed function parameter 332 that matches the statically typed function parameter 306. The statically typed implementation 324 of the statically typed function 330 may invoke the dynamically typed function 203 through a dynamically typed function specification 316. The invoking may cause the execution of the dynamically typed function implementation 322 of the dynamically typed function 203.

According to various embodiments, the statically typed function 328 and/or the dynamically typed function 203 may have multiple input and/or output parameters. Alternatively, the statically typed function 328 and/or the dynamically typed function 203 may have no input parameters and/or no output parameters.

Referring now to FIG. 3B, an exemplary embodiment is illustrated where a dynamically typed function 203 may be requested by a statically typed language 300. In FIG. 3B rectangles represent processes and the ellipses represent data elements.

As illustrated in FIG. 3B, the dynamically typed function 203 may be, for example, a MATLAB function 310. The MATLAB function 310 may be provided to the MATLAB function deployment tool 320, which may generate from that function 310 a type-unsafe API. The MATLAB function 310 may be invoked from the statically typed language 300 using a type-unsafe API 330, for example a vendor supplied API such as an API provided by the MathWorks, Inc.

Before using the MATLAB function 310 in a program or an application generated in the statically typed language 300, a type-safe API 370 may be generated by a type-safe API generator 210, for example by following the process illustrated in FIG. 3A. The type-safe API generator 210 may automatically generate the type-safe API 370. The generated type-safe API 370 may be used to convert a data type of the zero or more input parameters to the MATLAB function 310 from a data type that may be used by the statically typed language 300 to a data type recognized by the dynamically typed language 312, such as the MATLAB language. The user may provide a type-safe interface 340, such as the statically typed interface 304, and type conversion rules 350 to the type-safe API generator 210 for controlling and/or customizing the conversion of data types in the dynamically typed language 312 to data types in the statically typed language 300. Alternatively, the data types of the parameters of the MATLAB function 310 may be passed by reference to the statically typed language without being converted.

The type-safe API 370 generated by the type-safe API generator 210 may interact with the data conversion engine 380 and the type-unsafe API 330 for converting the data type of the zero or more outputs from the dynamically typed function 203 to data types that may be used by the statically typed language 300. A more detailed description of some of the technical details is provided below in connection with FIG. 4A in a functional diagram for an exemplary implementation. In FIG. 4A, rectangles represent processes and the ellipses represent data elements.

FIG. 4A illustrates an exemplary functional diagram of compiler and builder components for generating an exemplary type-safe interface according to one or more embodiments. Referring to FIG. 4A, MATLAB function 310 may be provided as a part of a MATLAB application 402 written in the dynamically typed language. MATLAB function 310 may be used in an application generated in statically typed language 300. Accordingly, target environment interface 410 may be developed for a target environment that may be used to develop the application written in the statically typed language 300. The API 330 for the dynamically typed language environment may be generated after compiler 412 is invoked. Compiler 412 may generate the API 330 for the dynamically typed language environment. The MATLAB Compiler 412 is an example of MATLAB Deployment Tool 320.

Figure 4B:
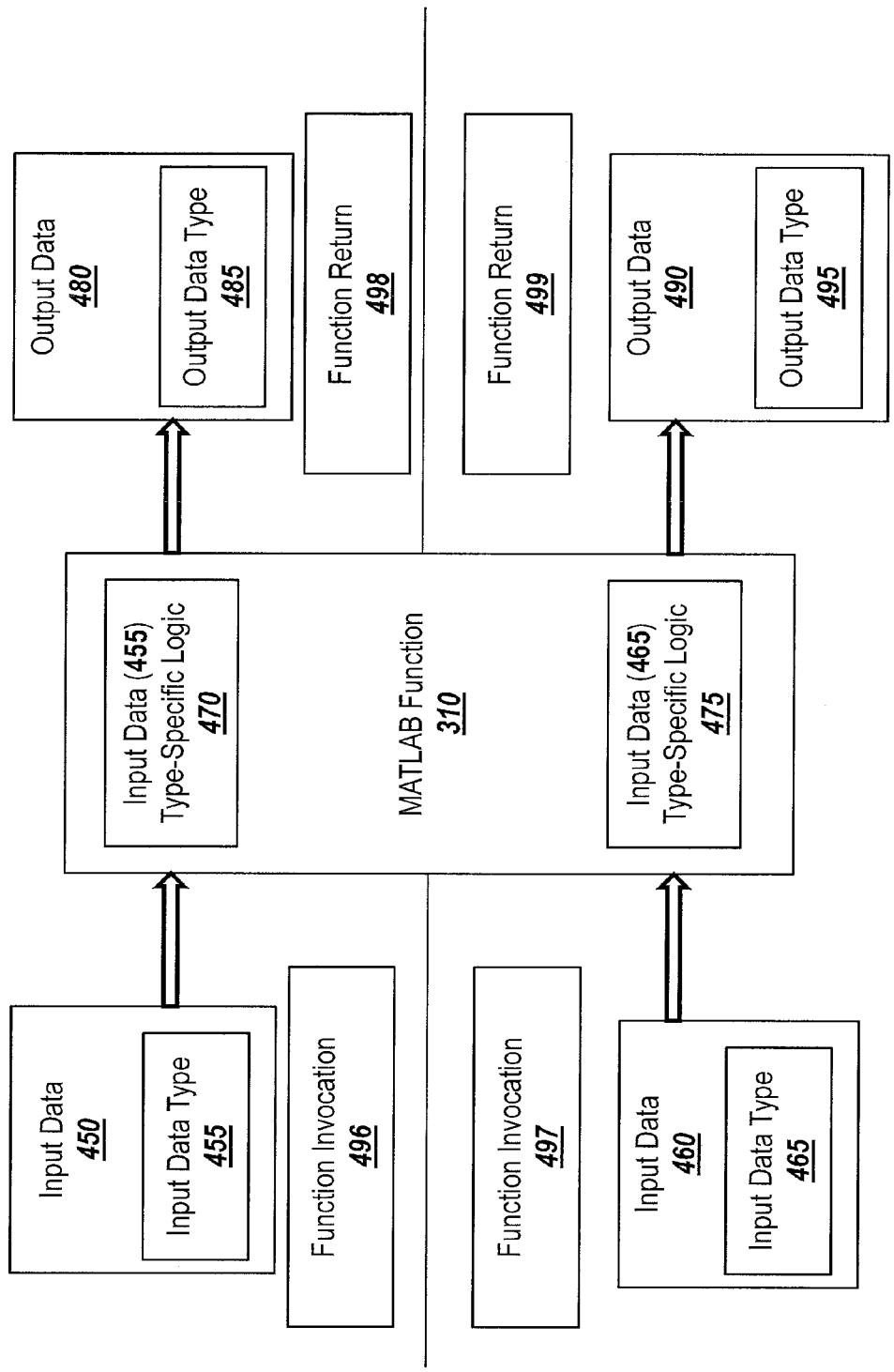
FIG. 4B illustrates different types of data processed by a dynamically typed function according to an embodiment of the invention.
Figure 4C:
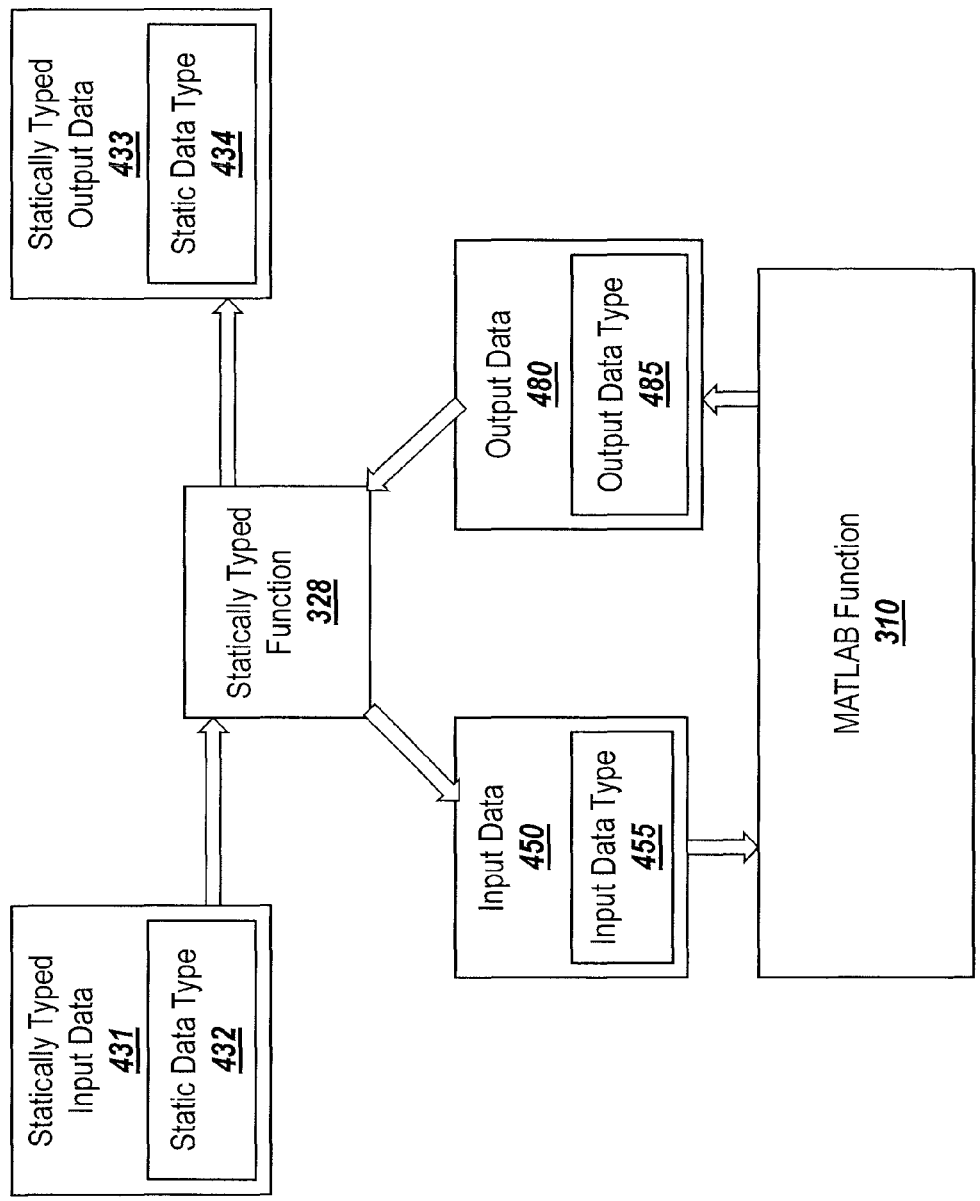
FIG. 4C illustrates an exemplary manner to convert data between static and dynamic types according to an embodiment of the present invention.

Referring to FIG. 4A, FIG. 4B and FIG. 4C, a MATLAB program 402 may comprise multiple MATLAB files and MATLAB functions 310. A MATLAB function 310 may perform one or more operations on input data 450 and 460, producing one or more output results 485 and 495. The data types of the inputs and outputs 455, 465, 485 and 495 may be different. A MATLAB function 310 may contain one or more type-specific logic blocks 470 and 475. A type-specific logic block 470 or 475 may perform different operations depending on the type of the input data. For example, function invocation 496 may provide input data 450 of input data type 455 to MATLAB function 310. This may activate data type specific block 470 and produce output data 480 of data type 485. The output data 480 may be returned via function return 498.

Function invocation 497 may provide input data 460 of input data type 465 to MATLAB function 310. This may activate data type specific block 475 and produce output data 490 of data type 495. The output data 490 may be returned via function return 499. Accordingly, a single MATLAB function 310 may accept various input data types 455 and 465. This is not the case for statically typed functions.

A parameter 322 of a statically typed function 328 may accept data of a fixed type. For example, statically typed function 430 may accept data of type 432 and return data of type 434. Data types 432 and 434 may be defined in statically typed language 300. A combination of input and output data types 432 and 434 may define a different statically typed function 430. Since a single MATLAB function 310 may accept and return many different combinations of input and output data types 455 and 485, multiple statically typed functions 430 may be required to call a single MATLAB function 310 with a combination of input and output data types 455 and 485. The target environment interface 410 may comprise these multiple statically typed functions 430. According to various embodiments, the user may provide the statically typed functions 328. Alternatively, a signature discovery tool 406 may analyze the dynamically typed function specification 316, usage of MATLAB files 402 and MATLAB functions 310 and automatically generate all or part of the target environment interface 410. Statically typed interface 304 is an example of target environment interface.

A type-safe API generation tool 210 may generate the type-safe API 370 using, for example, the target environment interface 410 and information about MATLAB files 402, such as the dynamically typed function specification 316. A statically typed language compiler, such as the C# compiler developed by Microsoft, may derive object code from API 330 with the type-safe API 370. This object code and additional files 427 may be packaged together in a deployable component 428 suitable for use in the statically typed language. The deployable component 428 may contain a statically typed function 328 capable of calling the implementation of the MATLAB function 310 provided in the MATLAB file 402. According to various embodiments, the deployable component 428 may be a part of a program or an application 426 provided in the statically typed language.

As illustrated in FIG. 4A, interaction with the MATLAB file 402 may be achieved using API 330 that depends on data types of the dynamically typed language 312, i.e. MATLAB. Embodiments of the present invention may generate a type-safe API 370 for each exported dynamically typed function. API 330 and the type-safe API 370 may be compiled by a compiler 422 for generating the deployable component 428 at the target environment, i.e. the statically typed development environment. According to various embodiments, a test suite for the dynamically typed language may be automatically generated based on the specification of the type-safe API 370. The test suite may be used to check whether the dynamically typed functions conform to the specification provided by the statically typed language interface. The test suite, i.e. the dynamically typed language data type validating API 420, may optionally be re-run for determining if the data conversion violates any type constraints.

Figure 5A:
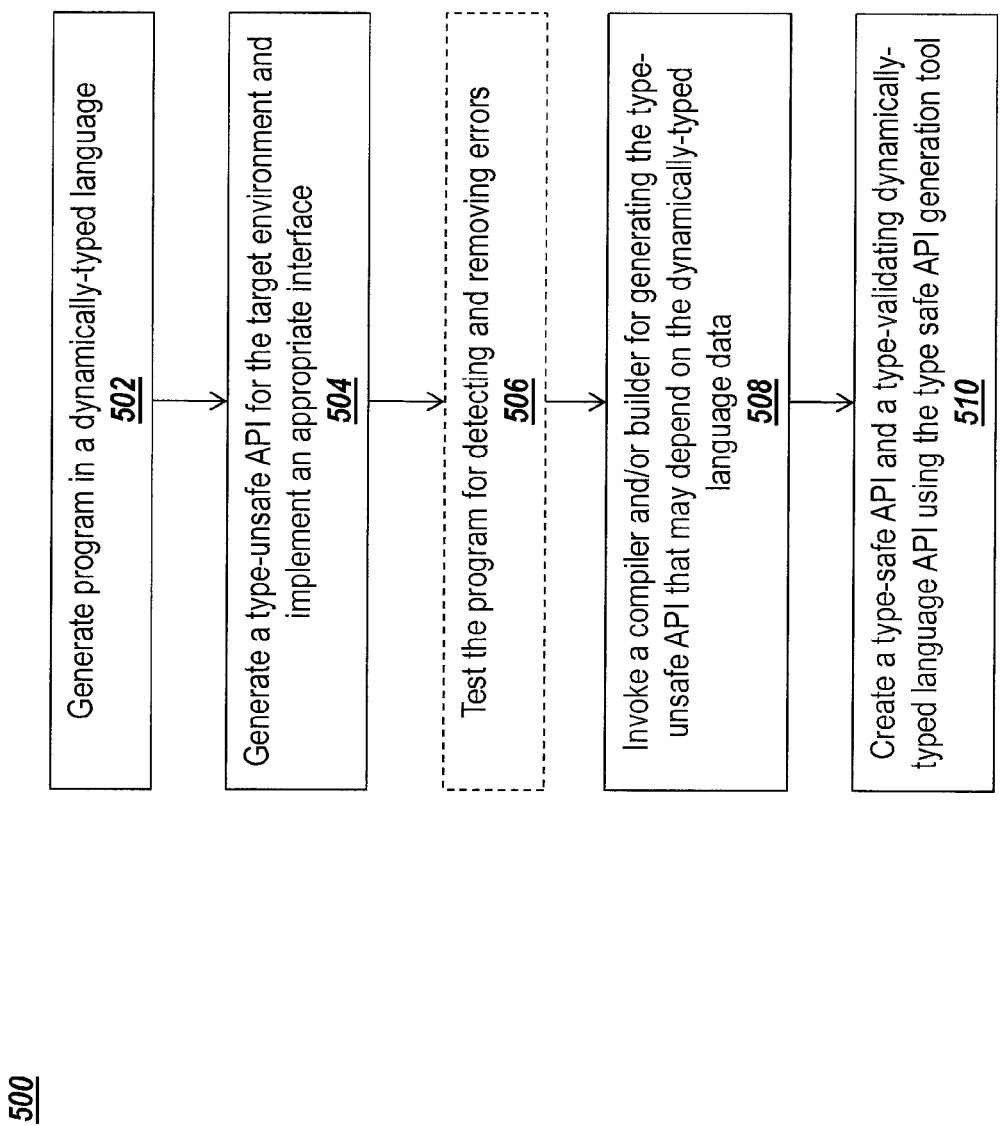
FIG. 5A illustrates an exemplary workflow according to an embodiment of the present invention.

FIG. 5A illustrates an exemplary workflow 500 that corresponds to the exemplary functional diagram of compiler and builder components illustrated in FIG. 4A. At step 502, a program is generated in a dynamically typed language. An API for the target environment is generated and an appropriate interface is implemented (step 504). The API may be a type-unsafe API. The program may be tested for detecting and removing errors (step 506). A compiler and/or builder may be invoked for generating the type-unsafe API that may depend on the dynamically typed language data types (step 508). The type-safe API generation tool may create a type-safe API and a type-validating dynamically typed language API (step 510).

FIG. 5B illustrates an exemplary workflow 550 where the dynamically typed language is the MATLAB language. After generating a type-unsafe API for the MATLAB environment, the target environment reflection mechanism is invoked on the target environment artifact for determining target function signatures (step 552). Certain errors may be detected such as argument number mismatch, missing type specification and/or target interface contains functions with no exported binding (step 554). Using a mapping between MATLAB types and native types, a type-safe API may be generated for each exported function (step 556). Optionally, MATLAB functions and MATLAB classes may be generated for issuing warnings or errors when input or output types differ from the known types (step 558). If there is a test suite, the test suite may be invoked for determining test data (step 560). Target environment test suite and/or example programs may be generated (562). MATLAB type validating API may be run for determining if there are any type constraint violations (step 564). A target environment component is generated and integrated into a larger application (step 566).

According to various embodiments, target environments may support class instances and/or methods. Some environments may support global, i.e. unclassified functions. Unclassified functions may include functions that are not part of a class. Both MATLAB and the target environments may support passing references to executable data as function parameters. If the programming environments permit, function parameters may be passed between the native environment and the MATLAB environment. For example, MATLAB function handles may be returned to the native environment and invoked in the native environment. Invocation may result in activation of a corresponding compiler such as, for example, the MATLAB Compiler Runtime (MCR), and execution of the appropriate code. Alternatively, native function references, such as delegates or functions, may be passed to MATLAB and invoked by the MATLAB functions.

Figure 5C:
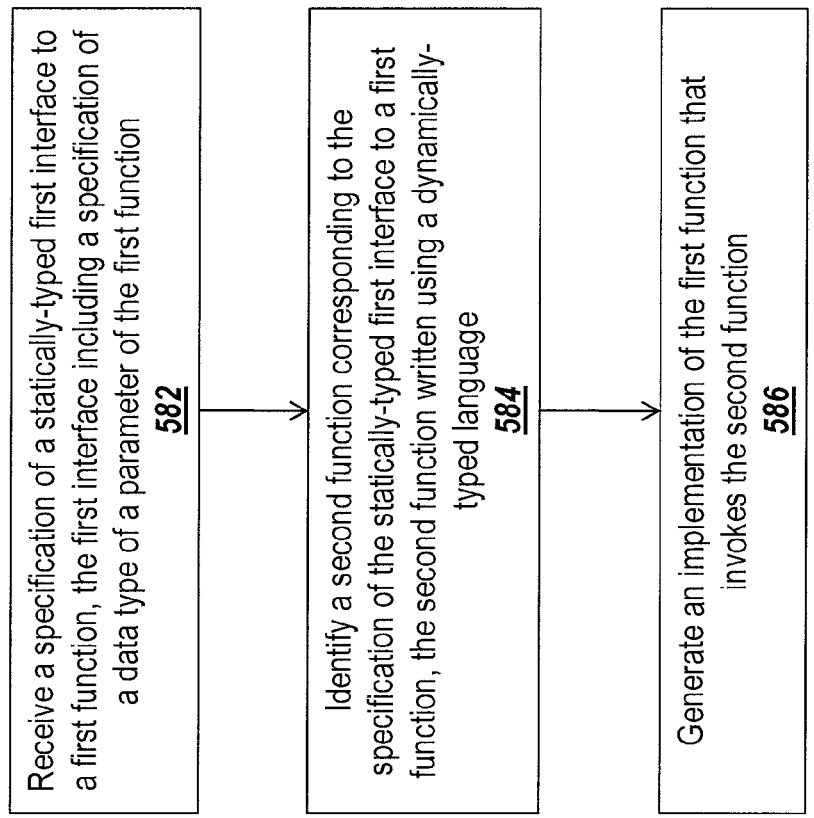
FIG. 5C illustrates and exemplary workflow according to an embodiment of the present invention.

FIG. 5C illustrates an exemplary workflow 580 where an implementation of a statically typed function invokes a dynamically typed function. A statically typed first interface to a first function may be received (step 582). The first interface may include a specification of a data type of a parameter of the first function. A second function corresponding to the specification of the statically typed first interface to the first function may be identified (step 584). The second function may be written using a dynamically typed language. An implementation of the first function that invokes the second function may be generated (step 586).

The following example illustrates the type safe API generation in the MATLAB® programming environment. The MATLAB® programming environment is used in connection with the following example for illustrative purposes only, and should not be construed limiting. The example produces a MATLAB-based software component with dual, parallel, type safe and non-type safe interfaces. The generated component is able to run outside of the MATLAB® environment, and therefore may be used in other programming environments, such as, for example, Microsoft's Visual Studio. The generated type safe interface provides one or more interface functions containing only types native to the external programming environment. Accordingly, developers working in the external environment do not have to learn how to use data types of the MATLAB® language.

Consider, for example, the following exported function named addOne. The function may add 1 to its input. The input may be numeric and may be either a scalar or a matrix.

```
function y = addOne(x)
% ADDONE Add one to numeric input.
%
% Helper function used in testing type-safe API.
    if ~isnumeric(x)
        error('Input must be numeric. Input was %s.', class(x));
    end
    y = x + 1;
end
```

In the foregoing code segment, function y=addOne(x) defines the function name, i.e. addOne, and specifies the inputs, i.e. x, and outputs, i.e. y. The block of comment text following the symbol % explains the purpose and operation of the function. The comment text is not executed when the code segment is executed. The first statement in the function, if ~isnumeric(x), tests the input, x, to determine if the input is numeric. The ~operator represents logical negation. Accordingly, this line of code can be read as "if the input matrix x is not numeric". If the input is not numeric, addOne invokes the error function to indicate that the function received an input that the function cannot process. Finally, the function addOne adds one to the input with the statement, y=x+1. Addition represented by the symbol "+" is a matrix operator that adds one to each element of x. According to various embodiments x may be a 1-by-1 matrix, i.e. a scalar. Note that the dynamic nature of the MATLAB® language allows calling the addOne function with many different types of inputs: integers, doubles, scalars and matrices.

A component may be created from the addOne function using either mcc or deploytool. For example, the component may be named Antikythera and the addOne class function may be placed into a class named Mechanism:
mcc '-B' 'dotnet:Antikythera,Mechanism,2.0,private,local' 'addOne'
The IAddOne interface is a .NET interface that defines the boundary between the statically typed language, e.g. C#, and the dynamically typed function addOne. As noted above, in the MATLAB® language, the addOne function may be called with many different types of inputs. The IAddOne interface specifies the valid ways to invoke the addOne function in the statically typed language C#: with scalar integers, scalar doubles, a vector of doubles and a 2D matrix of doubles. The first three functions in the IAddOne interface take the same type, e.g. integer, and number of inputs, e.g. one. Each function may express a different order of inputs and outputs, which demonstrates the flexibility of the function matching algorithm. The IAddOne interface consists of types native to the statically typed language C#. There are no non-native types, e.g. no MATLAB types, in the IAddOne interface. The IAddOne interface specifies six overloads of the addOne function. All of the overloads may have one input and one output to match the MATLAB addOne function, though the type and position of these parameters may vary:

```
public interface IAddOne
{
    int addOne(int x);
    void addOne(out int y, int x);
    void addOne(int x, out int y);
    double addOne(double x);
    System.Double[ ] addOne(System.Double[ ] x);
    System.Double[,] addOne(System.Double[,] x);
}
```

The IAddOne interface may be compiled into an assembly.
csc /target:library /out:IAddOne.dll IAddOne.cs
In this case, code that contains only the IAddOne interface may be created. The IAddOne interface may already be part of an already-compiled assembly at the user site. In fact, the interface may be created before the MATLAB function is written. There are many ways to create the interface. The approach used in the present example is for illustrative purposes only and should not be construed as limiting.

If a program is written in the statically typed language C#, and the program calls the addOne function with a combination of inputs and/or outputs that differs from those specified in the IAddOne interface, the compiler of the statically typed language C# will deliver an error message. The error message indicates that the type safe requirements are not met. Accordingly, the error may be identified by the compiler before the runtime of the program.

Once the IAddOne interface has been compiled into an assembly and the addOne function has been compiled into a non-type safe component, ntswrap tool can analyze the assembly and component for generating a type safe wrapper. The type safe component automatically manages the conversion of the native static types of the IAddOne interface into the MATLAB types required by the inputs of the addOne function, and the conversion of the MATLAB outputs of the addOne function into the native return values of the IAddOne interface.

The ntswrap tool may be used to generate a type-safe API. According to various embodiments, this tool may be available as a MATLAB function or a Windows console executable.
ntswrap.exe -c Antikythera.Mechanism -i IAddOne -a IAddOne.dll
ntswrap may accept command line switches in any order. A type-safe API for the Builder NE class Mechanism may be generated in the namespace AntikytheraNative. The signatures given by the .NET interface IAddOne may be matched. The binary definition of IAddOne is identified in IAddOne.dll. The binary definition of Mechanism is identified in AntikytheraNative.dll. The -b switch may be used for specifying the path to the directory containing the Builder NE component. This produces a type-safe API in the form of a new class MechanismIAddOne, which is generated into MechanismIAddOne.cs. By default, ntswrap may compile the source code into an assembly MechanismIAddOne.dll.

The type safe component generated by the ntswrap tool may then be used by a statically typed program. If the statically typed language, e.g. C#, is an object-oriented language, the generated type safe component may contain a generated class, e.g. MechanismIAddOne that conforms to the IAddOne interface. The client C# program may create an instance of the MechanismIAddOne class, and invoke the functions in the IAddOne interface via the methods in the generated MechanismIAddOne class. The following exemplary main program calls all the overloads of addOne defined by the IAddOne interface:

```
using System;
using System.Text;
public class Program
```

-continued

```
{
    static public int Main(string[ ] argList)
    {
        % The object instance is created:
        IAddOne m = new MechanismIAddOne( );
        try
        {
            // Output as return value
            int one = 1;
            int two = m.addOne(one);
            Console.WriteLine("addOne({0}) = {1}", one, two);
            // Output: first parameter
            int i16 = 16;
            int o17;
            m.addOne(out o17, i16);
            Console.WriteLine("addOne({0}) = {1}", i16, o17);
            // Output: second parameter
            int three;
            m.addOne(two, out three);
            Console.WriteLine("addOne({0}) = {1}", two, three);
            // Scalar doubles
            double i495 = 495.0;
            double third = m.addOne(i495);
            Console.WriteLine("addOne({0}) = {1}",i495, third);
            // Vector addition
            % A vector of doubles is created:
            System.Double[ ] i = { 30, 60, 88 };
            % System adds one to the vector of doubles:
            System.Double[ ] o = m.addOne(i);
            Console.WriteLine(
                "addOne([{0} {1} {2}]) = [{3} {4} {5}]",
                i[0], i[1], i[2], o[0], o[1], o[2]);
            // Matrix addition
            System.Double[,] i2 = { {0, 2}, {3, 1} };
            System.Double[,] o2 = m.addOne(i2);
            Console.WriteLine(
                "addOne([{0} {1}; {2} {3}]) = [{4} {5}; {6} {7}]",
                i2[0,0], i2[0,1], i2[1,0], i2[1,1],
                o2[0,0], o2[0,1], o2[1,0], o2[1,1]);
        }
        catch (Exception Ex)
        {
            Console.WriteLine("Exception " + Ex.Message);
            return(-1);
        }
        Console.WriteLine("No Exceptions");
        return(0);
    }
}
```

The host program may be compiled into an executable, referencing three assemblies AddOne.dll: For the definition of the .NET native type interface IAddOne; MechanismIAddOne.dll: For the definition of the generated type-safe API; and AntikytheraNative.dll: For the definition of the Builder NE component. According to various embodiments, there may be no need to reference MWArray.dll in the host program, as these data types may be hidden behind the type-safe API in MechanismIAddOne.

```
csc.exe /debug /out:AddMaster.exe AddMaster.cs
    /r:MechanismIAddOne.dll /r:IAddOne.dll /r:AntikytheraNative.dll
```

The host program may be run using the following script:

```
c:\>AddMaster
addOne(1) = 2
addOne(16) = 17
addOne(2) = 3
addOne(495) = 496
addOne([30 60 88]) = [31 61 89]
addOne([0 2; 3 1]) = [1 3; 4 2]
No Exceptions
```

According to another exemplary implementation, both primitive (strings and arrays) and composite (structures) .NET native types may be used in a single program. Composite .NET data types may be permitted both as inputs and outputs. The following example defines a second interface IAdd. The IAdd interface includes functions that take numeric and non-numeric inputs. The IAdd interface does not call the addOne MATLAB function from the previous example. Instead, the IAdd interface calls a more flexible MATLAB function named add:

```
function result = add(x, y)
% Add numbers or concatenate strings. Mixed inputs yield string output.
% Type check inputs
    if ~isnumeric(x) && ~ischar(x) && ~isstruct(x)
        error('add: first input must be string, struct, or number, was ''%s''', class(x));
    end
    if ~isnumeric(y) && ~ischar(y)
        error('add: second input must be string or number, was ''%s''', class(y));
    end
% Perform addition / concatenation
    if isnumeric(x)
        if isnumeric(y)
            result = x + y;
        else
            x = sprintf('%d ', x);
        end
    elseif isnumeric(y)
        y = sprintf('%d ', y);
    elseif isstruct(x)
        data = cellfun(@(f) x.(f), fieldnames(x), 'UniformOutput', false);
        x = [data{:}];
    end
    if ~exist('result', 'var')
        result = [x, ' ', y];
    end
```

The add function accepts strings, doubles and structures. If the inputs are numeric matrices, the add function adds the inputs together. If any of the inputs is a string, the add function changes the other input into a string and concatenates the strings together. Concatenating two strings is similar to adding two strings. If the inputs are structures containing strings, the add function concatenates the fields of the structure together.

The .NET interface IAdd defines the behavior of the add function in a statically typed language. The IAdd interface specifies valid ways to call the add function from the statically typed language, e.g. C#, using only types native to the statically typed language. The complexity of the IAdd interface demonstrates that the type safe API generation process is not limited to simple, primitive types, but that it is capable of managing complex, structured, .NET native types. The generated wrapper code marshals, i.e. converts, the .NET structures to MATLAB structures and vice versa, as necessary.

Figure 6:
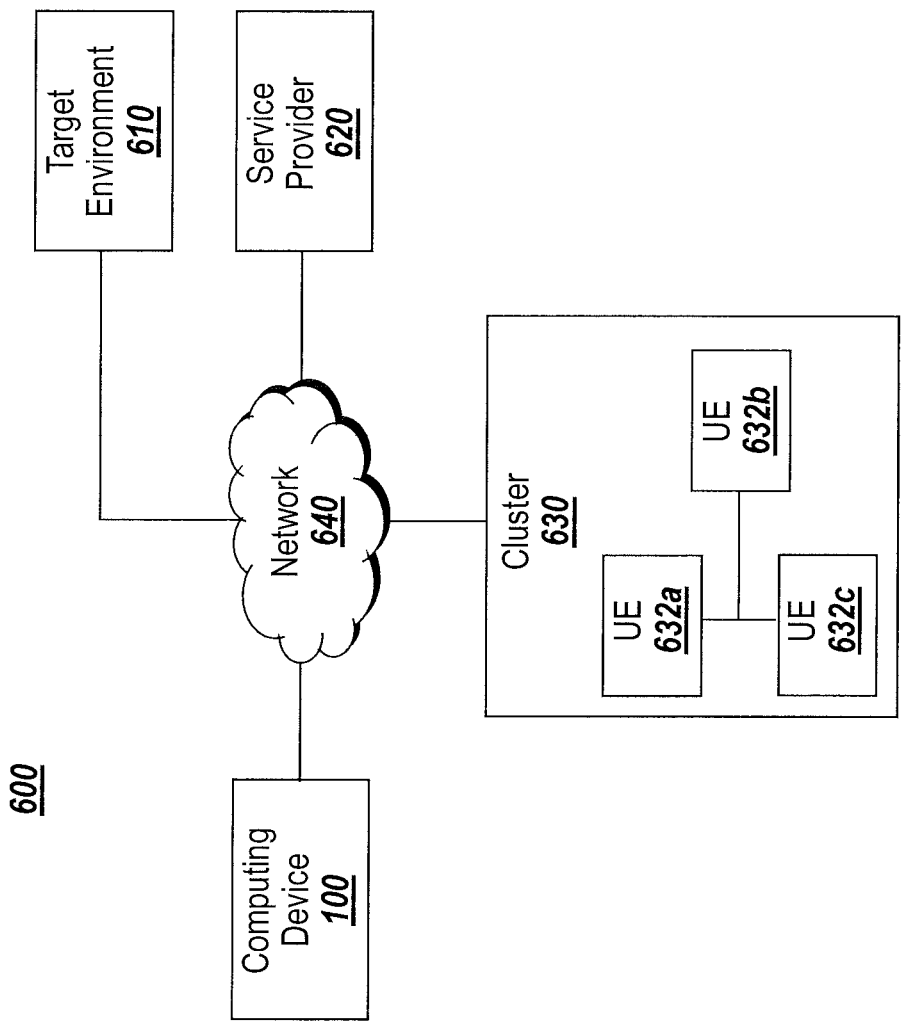
FIG. 6 illustrates a block diagram of an example of a distributed computing environment that may implement one or more embodiments of the invention.

One or more embodiments of the invention may be implemented in a distributed environment. FIG. 6 illustrates an example of a distributed environment 600 that may implement one or more embodiments of the invention. Referring to FIG. 6, environment 600 may contain various components including computing device 100, target environment 610, service provider 620, cluster 630, and communications network 640. Note that the distributed environment 600 is just one example of a distributed environment that may be used with one or more embodiments of the invention. Other distributed environments that may be used with one or more embodiments of the invention may contain more components or fewer components than illustrated in FIG. 6. Moreover, the components in the distributed environments may be arranged differently than the arrangement shown in FIG. 6. In addition, the distributed environments may implement various "cloud computing" frameworks.

Details of computing device 100 were described above with respect to FIG. 1. In distributed environment 600, computing device 100 may, among other things, exchange information (e.g., data) with other components in the communications network 640 (e.g., target environment 610, service provider 620, and cluster 630). Computing device 100 may interface with the communications network 640 via a communication interface 180.

Target environment 610 may be configured to interpret and/or execute, for example, one or more embodiments of the invention, which may be generated in or otherwise made available to the distributed environment 600. The communications network 640 may include digital and/or analog aspects. Information exchanged in communications network 640 may include machine-readable information having a format that may be adapted for use, for example, in the communications network 640 and/or with one or more components in the communications network 640.

For example, the information may be encapsulated in one or more packets that may be used to transfer the information through the communications network 640. Information may be exchanged between components in the communications network 640 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

The communications network 640 may comprise various network devices, such as gateways, routers, switches, firewalls, servers, repeaters, address translators, etc. Some, or all, of the communications network 640 may be wired (e.g., using wired conductors, optical fibers) and/or wireless (e.g., using free-space optical (FSO), radio frequency (RF), acoustic transmission paths). Some, or all, of the communications network 640 may include a substantially open public network, such as the Internet. Some, or all, of the communications network 640 may include a more restricted network, such as a private corporate network or virtual private network (VPN). It should be noted that implementations of communications networks and/or devices operating on communications networks described herein are not limited with regards to, for example, information carried by the communications networks, protocols used in the communications networks, and/or the architecture/configuration of the communications networks.

Cluster 630 may include a number of units of execution (UEs) 632 that may execute or interpret one or more embodiments of the invention or portions thereof on behalf of computing device 100 and/or another component, such as service provider 620. The UEs 632 may reside on a single device or chip or on multiple devices or chips. For example, the UEs 632 may be implemented in a single ASIC or in multiple ASICs. Likewise, the UEs 632 may be implemented in a single computer system or multiple computer systems. Other examples of UEs 632 may include, for example, some combination of FPGAs, CPLDs, ASIPs, processors, multiprocessor systems-on-chip (MPSoCs), graphic processing units, and/or microprocessors. The UEs 632 may be configured to perform operations on behalf of another component in the distributed environment 600. For example, in an embodiment, the UEs 632 are configured to execute portions of code associated with TCE 138. Here, TCE 138 may dispatch certain activities pertaining to one or more embodiments of the invention to the UEs 632 for execution. The service provider 620 may configure cluster 630 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from a practice of the invention. For example, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored in one or more tangible computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A computer-implemented method comprising:
   receiving a specification of a statically typed first interface to a first function, the first interface including a specification of a data type of a parameter of the first function;
   analyzing the specification of the statically typed first interface to the first function to determine a function signature;
   determining, based on the analyzing, the function signature;
   identifying a second function using the function signature, the second function corresponding to the specification of the statically typed first interface to the first function, the second function written using a dynamically typed language; and generating an implementation of the first function that invokes the second function through a dynamically typed function specification associated with the second function.

2. The method of claim 1, wherein the implementation of the first function includes converting the data type of the parameter of the first function to a data type compatible with the dynamically type language for passing the parameter to the second function.

3. The method of claim 1, wherein the first function or the second function has one or more input parameters or output parameters.

4. The method of claim 1, wherein the first function outputs a first return value and the second function outputs a second return value.

5. The method of claim 4, wherein the implementation of the first function converts the second return value of the second function to the data type specified by the first return value of the first function, the first return value specified by the first interface.

6. The method of claim 1, wherein the implementation of the first function converts one or more parameters of an output of the second function to the data type specified by one or more parameters of an output of the first function, the output of the first function specified by the first interface.

7. The method of claim 1, wherein the implementation of the first function includes passing by reference a parameter of the first function to the second function.

8. The method of claim 1 further comprising:
receiving an extensible set of runtime rules that determine how to generate the implementation of the first function that invokes the second function.

9. The method of claim 1, wherein the first function executes in a first computing device and the second function executes in a second computing device different than the first computing device.

10. One or more non-transitory computer-readable storage media storing instructions that, when executed on a processor, cause the processor to:
receive a specification of a statically typed first interface to a first function, the first interface including a specification of a data type of a parameter of the first function;
analyze the specification of the statically typed first interface to the first function to determine a function signature;
determine, based on the analyzing, the function signature;
identify a second function using the function signature, the second function corresponding to the specification of the statically typed first interface to the first function, the second function written using a dynamically typed language; and
generate an implementation of the first function that invokes the second function through a dynamically typed function specification associated with the second function.

11. The media of claim 10, wherein the implementation of the first function includes converting the data type of parameter of the first function to a data type compatible with the dynamically typed language for passing the parameter to the second function.

12. The media of claim 10, wherein the first function or the second function has one or more input parameters or output parameters.

13. The media of claim 10, wherein the first function outputs a first return value and the second function outputs a second return value.

14. The media of claim 13, wherein the implementation of the first function converts the second return value of the second function to the data type specified by the first return value of the first function, the first return value specified by the first interface.

15. The media of claim 10, wherein the implementation of the first function converts one or more parameters of an output of the second function to the data type specified by one or more parameters of an output of the first function, the output of the first function specified by the first interface.

16. The media of claim 10, wherein the implementation of the first function includes passing by reference a parameter of the first function to the second function.

17. The media of claim 10 further storing instructions that, when executed by the processor, cause the processor to:
receive an extensible set of runtime rules that determine how to generate the implementation of the first function that invokes the second function.

18. The media of claim 10, wherein the first function executes in a first computing device and the second function executes in a second computing device different than the first computing device.

19. A system comprising:
a first processor for:
receiving a specification of a statically typed first interface to a first function, the first interface including a specification of a data type of a parameter of the first function;
analyzing the specification of the statically typed first interface to the first function to determine a function signature;
determining, based on the analyzing, the function signature;
identifying a second function using the function signature, the second function corresponding to the specification of the statically typed first interface to the first function, the second function written using a dynamically typed language; and
generating an implementation of the first function that invokes the second function through a dynamically typed function specification associated with the second function.

20. The system of claim 19, further comprising:
a second processor for executing the second function, the first processor executing the first function.

* * * * *

UNITED STATES PATENT AND TRADEMARK OFFICE
CERTIFICATE OF CORRECTION

PATENT NO.        : 8,769,486 B2
APPLICATION NO.   : 13/176403
DATED             : July 1, 2014
INVENTOR(S)       : Peter Hartwell Webb It is certified that error appears in the above-identified patent and that said Letters Patent is hereby corrected as shown below:

On the Title Page, column 2, Item (56) under "Other Publications", line 13, delete "Verion" and insert --Version-- in lieu thereof.

In the Claims
Column 19, line 8, (claim 2, line 4), delete "type" and insert --typed-- in lieu thereof.

Signed and Sealed this
Fourteenth Day of October, 2014

Michelle K. Lee
*Deputy Director of the United States Patent and Trademark Office*